April 18, 1961 R. W. NORDIN 2,980,759
MOTOR CONTROL
Filed Nov. 13, 1958 2 Sheets-Sheet 1

INVENTOR
ROBERT W. NORDIN
BY
R.C. Terry
ATTORNEY

April 18, 1961  R. W. NORDIN  2,980,759
MOTOR CONTROL

Filed Nov. 13, 1958  2 Sheets-Sheet 2

INVENTOR
ROBERT W. NORDIN
BY
R.C. Terry
ATTORNEY

United States Patent Office 2,980,759
Patented Apr. 18, 1961

2,980,759
MOTOR CONTROL
Robert W. Nordin, Skokie, Ill., assignor to Teletype Corporation, Chicago, Ill., a corporation of Delaware
Filed Nov. 13, 1958, Ser. No. 773,635
14 Claims. (Cl. 178—4.1)

The present invention relates to remote control systems and apparatus and more particularly to automatic motor stop mechanisms.

The system according to the present invention is particularly adapted to telegraph lines having unattended stations. In such stations, it is desirable to stop the motors automatically when no signals are received for a predetermined period, and to start the motors upon resumption of signal transmission.

The principal object of the invention is to provide a simple electro-mechanical motor control device dually controlled by a timing device and the condition of the signal line.

Another object of the invention is to provide a motor control arrangement comprising an element pivotable about a plurality of points and a control magnet having an armature adapted to provide a movable fulcrum arranged to select the points about which said element is pivotable.

The objects of the present invention are attained by providing electrical contacts, an electromagnet and a floating contact-controlling element for operating said contacts, the operation of said contacts being effected in part by the normal telegraphic apparatus through the instrumentality of a time delay mechanism or timer. The motor-stop control contacts are operated by the timing device, which results in stopping the motor when the signal line has remained closed with normal marking current of idle line for a predetermined interval. The interrelation of electromagnet, contacts and floating element is such that the current in the line may be discontinued to produce a change in the position of the floating element, without starting the motor. Subsequently, the current in the line may be re-established to produce a further change in the condition of the floating element which will start the motor and which will return the control elements to normal idle line state. A stopped motor may be restarted by an opening of the line circuit followed by a reclosing of the signal line circuit, and the interruption may be momentary or may continue for any interval of time.

A more complete understanding of the present invention may be had from the following description taken in conjunction with the accompanying drawings, wherein.

Figure 6:
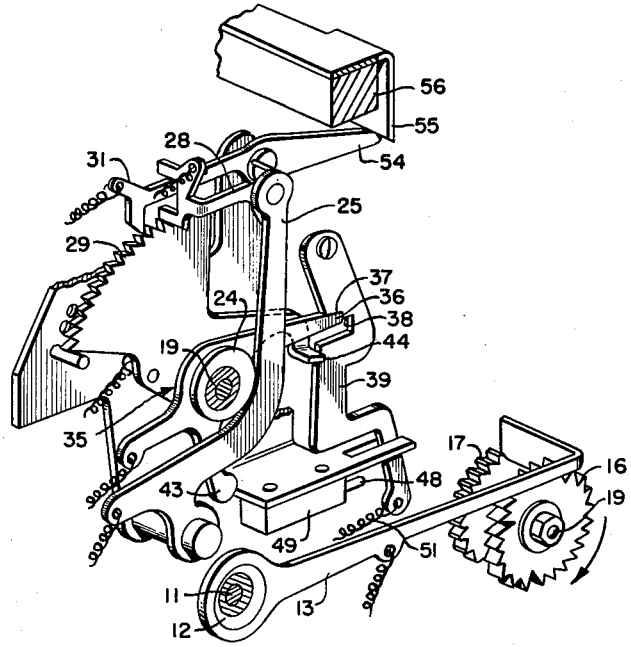
Fig. 6 is a perspective view of the timing device used with the present invention.

Having reference to Fig. 6, the timing facilities employed in the practice of the present invention are of the type fully disclosed in United States Patent No. 2,640,873, issued June 2, 1953, to F. C. Moebius, and comprise a first ratchet wheel having every seventh tooth cut twice the depth of the normal teeth, a second ratchet wheel juxtapositioned to said first ratchet wheel, a pawl normally engageable with said first ratchet wheel and adapted to engage both ratchet wheels (every seventh step in the present embodiment), a cam associated with said second ratchet, and a pawl-operated ratchet segment controlled by said cam to time the closure of a motor control contact.

In the description of the timing device shown in Fig. 6, it is assumed that the motor circuit is closed and hence the motor 107 (Fig. 7) of the telegraph apparatus (which is of the type shown in copending application, Serial No. 734,907, filed May 13, 1958, by R. W. Nordin) is running and therefore, the main shaft 11 (comparable to shaft 58, Fig. 2, of said copending application) is rotating. The main shaft 11 in rotating, causes the pawl 13 to be reciprocated to step the ratchets 16 and 17 mounted on shaft 19. It is further assumed that there is traffic on the signal line and accordingly the rock shaft 56 shown in Fig. 5 (comparable to shaft 185, Fig. 17, of said copending application) will be rocked cyclically for each cycle of operation of the telegraph apparatus in response to signals received. The bail 55 will therefore act upon the projection 54 of detent pawl 31 for each rocking cycle of the shaft 56 to prevent the stepping of ratchet segment 29 during the normal printing operation of the telegraph apparatus. Therefore, switch 49 cannot be operated except in response to prolonged cessation of operation of shaft 56.

Now, if traffic on the signal line should cease, then the bail 55 will no longer oscillate, but remain in its solid line position, while the main shaft 11 is still rotating to continue to reciprocate the pawl 13, through the instrumentality of eccentric 12. The ratchet wheels 16 and 17 will continue to be rotated to impart rotation to the cam 24 (also mounted on shaft 19) to impart, in turn, through lever 25 and pawl 28, step-by-step rotation to the ratchet segment 29 until the lateral projection 44 impinges against arm 43 to rock the lever 35 to disengage arm 36 from shoulder 37 and engage shoulder 38 to enable lever 39 to respond to the pull of spring 51 to depress the plunger 48 to operate the switch 49, to establish a motor control condition as will presently appear.

Figure 1:
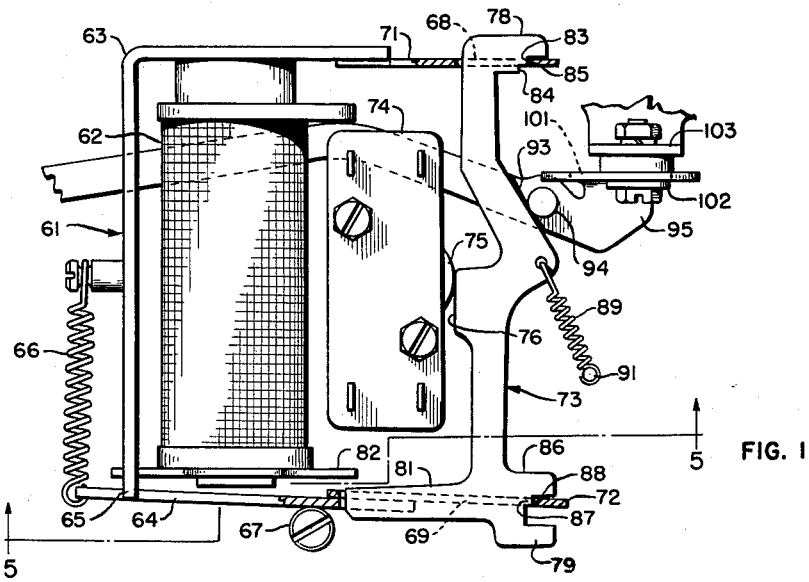
Fig. 1 is a plan view of the motor start and stop device according to the present invention.

In Fig. 1 is shown the motor start and stop control device 61 which comprises an electromagnet 62 mounted in a bracket 63, and having an armature 64 pivotally articulated at 65 to the bracket 63. Armature 64 is spring biased about pivot 65 by a spring 66 against an adjustable stop 67. Suitably positioned substantially parallel to the axis of the magnet 62 and guided in slots 68 and 69 in extensions 71 and 72 of the bracket 63 and armature 64, respectively, for limited slidable movement therein, is a floating element or stepping lever 73. It is, of course, understood that extensions 71 and 72 may be integral parts of the bracket 63 and armature 64, respectively, and not necessarily attached as shown in Figs. 1 to 4.

Positioned between the floating element 73 and the magnet 62 is a switch 74 having a plunger type operating element 75 adapted to cooperate with a projection 76 on the confronting edge of element 73 substantially midway between the guiding extensions 71 and 72. The plunger 75 is normally spring biased outwardly (with respect to the switch 74) a limited amount by a contact spring (or other suitable means) to close the contact 77 (shown in the circuit in Fig. 7).

The sliding movement of floating element 73 longitudinally thereof in the guide slots 68 and 69 in extensions 71 and 72 is limited by projections 78 and 79 of element 73. Floating element 73 is provided with a laterally extending arm 81 at the lower end thereof (as viewed in Figs. 1 to 4) adapted to cooperate with the edge of a plate 82 secured to the magnet 62, in a manner hereinafter described. Formed on projection 78 are two steps or shoulders 83 and 84 adapted to cooperate with the end 85 of the guide slot 68, as will be described. Also, formed on a further projection 86 adjacent to projection 79, and confronting the projection 79 is a step or shoulder 87 adapted to cooperate with the end 88 of the guide slot 69 in extension 72, as will presently appear.

Figure 5:
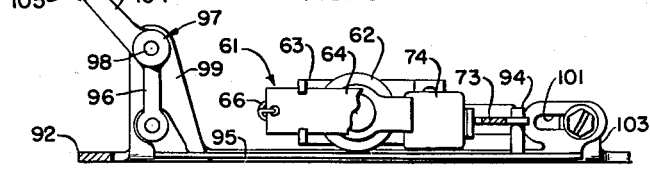
Fig. 5 is a cross-sectional view taken on line 5—5 of Fig. 1.

Attached to the floating element 73 at a point substantially midway between the extension 71 and the armature extension 72 is one end of a spring 89, the other end being attached to a spring post 91 mounted on the bracket or mounting plate 92 (Fig. 5). The function of spring 89 is to supply an outward (rightward, as viewed in Fig. 1) component to the floating element 73 away from the switch 74, as will hereinafter appear.

The floating element 73 is also provided with a cam surface 93 located eccentrically with respect to the midpoint between extensions 71 and 72, and on the side nearer to extension 71. The slope on the cam surface 93 is such as to enable a camming stud 94 acting thereon, in a manner to be presently described, to urge the floating element 73 simultaneously in two directions; namely, toward the plunger 75 of switch 74, thus urging the plunger 75 inwardly with respect to the switch to open contact 77 therein, and downwardly (as viewed in Fig. 1) to seat not only the shoulder 83 of projection 78 on the end 85 of the guide slot 68 but also to seat the step or shoulder 87 on the end 88 of guide slot 69.

As viewed in Fig. 5, the camming stud 94 is secured to a link 95 connected pivotally at one end to the depending arm 96 of a lever 97 which is pivotally mounted on a pivot stud 98 secured to a bracket 99 carried on plate 92. The opposite end of link 95 is provided with a slot 101 by means of which said link 95 is slidably supported on a stud 102 fixed to a bracket 103 mounted on said plate 92. The vertical arm 104 of lever 97 carries a laterally directed stud 105 which cooperates with the bifurcated end of an arm 106 clamped to the operating shaft 56, so that, as the shaft 56 is rocked cylically, reciprocatory motion is imparted to the link 95 through lever 97. The reciprocatory motion thus imparted to the link 95 will cause the stud 94 to periodically act upon the cam surface 93 of the floating element 73 to maintain the element 73 in the normal position shown in Fig. 1, whereat the shoulder 83 engages end 85 of guide slot 68 in extension 71, and shoulder 87 engages the end 88 of the guide slot 69 in the armature extension 72. Thus, due to the coaction between stud 94 and cam surface 93, a means is provided for returning the floating element 73 to a normal or initial position after the effectuation of a motor control operation, as will presently be seen.

Figure 7:
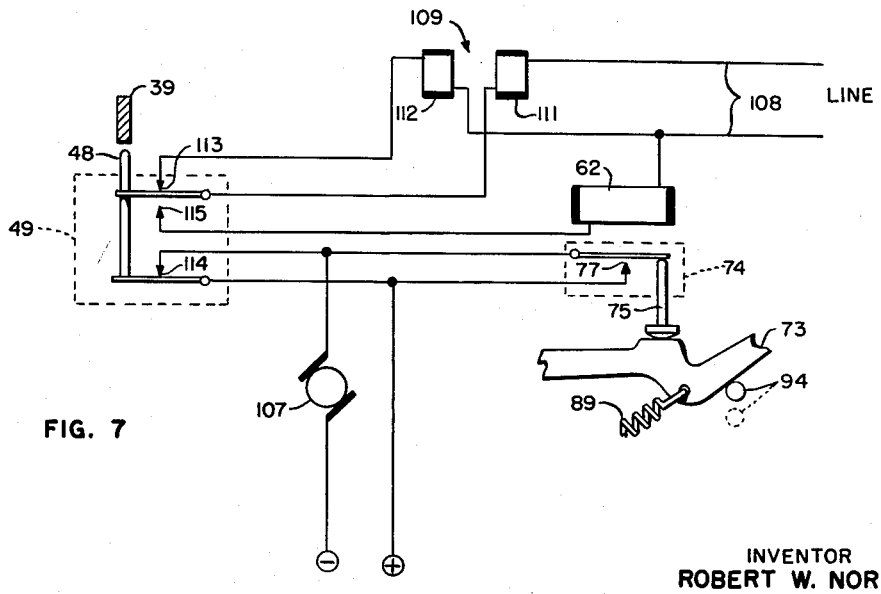
Fig. 7 is a circuit diagram of the motor control arrangement according to the present invention.

Having reference to the circuit arrangement in Fig. 7, the timer switch-control lever 39, after a predetermined cessation of signal reception will depress the plunger 48 of switch 49, as previously described. In the circuit shown in Fig. 7, the selector magnet 109 is indicated as comprising a pair of coils 111 and 112, and is connected to the signal line 108 with a contact 113 introduced between said coils 111 and 112 so that the line circuit extends from one side of the line 108, through coil 111, then through said contact 113 in the aforementioned switch 49, and through the winding of the other coil 112 to the other side of the signal line 108. The purpose of this arrangement is to facilitate the substitution of the motor control magnet 62 (as will presently appear) for one of the coils (112 in the present embodiment) of the selector magnet 109 pursuant to a motor control operation, thus maintaining the same line circuit conditions under either an idle line or busy line condition.

A description of the motor start and stop control system according to the present invention will now be given. The operation of the timing device shown in Fig. 6 has been described hereinfore. As previously mentioned, the timer is attempting, during the reception of signals, to operate the switch 49. However, when traffic on the signal line ceases, the switch 49 is operated after a predetermined time interval, to open contacts 113 and 114, and to close contact 115 (Fig. 7). The motor 107 will stop running due to the cutting off of the power therefrom by the opening of contact 114.

Upon the closing of contact 115, the line circuit is completed from one side of line 108 through coil 111 of selector magnet 109, then through contact 115 (now closed) and through motor control magnet 62 to the other side of line 108. It is thus seen that the magnet 62 has been substituted for coil 112 in the line circuit, thus achieving a motor control operation without introducing a further load on the line circuit; that is, no additional resistance is introduced in the line.

Also, in an auxiliary motor circuit is the contact 77 contained in the switch 74 associated with the motor control magnet 62. It is noted that the switch 74 is wired in parallel with the timing switch 49. The contact 77 is maintained normally in an open condition due to the fact that the floating element 73 is, during operation of the telegraph apparatus, maintained in its normal position as shown in Fig. 1 by the periodic coaction of stud 94 and cam surface 93, as previously described.

Figure 2:
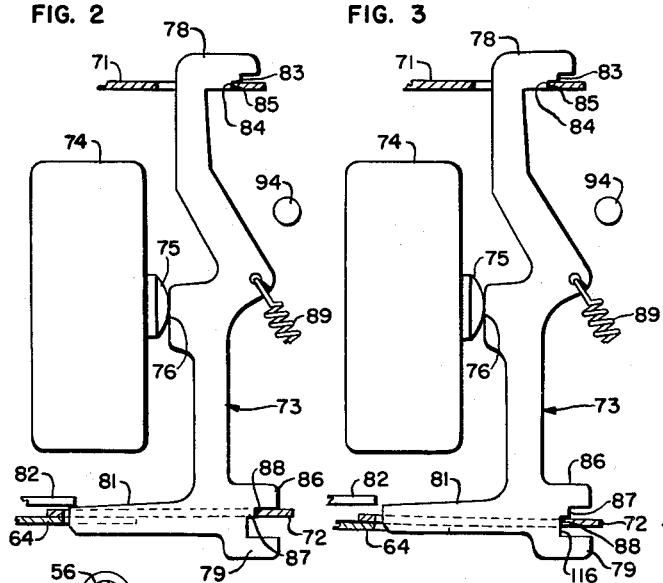
Figs. 2, 3 and 4 are views illustrating the positionments of the floating elements under various conditions of operation.

As the magnet 62 is energized, it attracts its armature 64 and causes extension 72 thereof, which at this time coacts with the projection 86, to actuate the floating element 73 upwardly, as viewed in Fig. 1 (of course, since Fig. 1 is a plan view, the element 73 is disposed in a horizontal position and is thus actuated in this instance toward the extension 71) so that the shoulder 83 of element 73 is disengaged from the end 85 of slot 68 in extension 71, and the element 73 is permitted to respond to the combined actions of spring 89 and the spring (not shown) acting on the plunger 75 urging it outwardly against projection 76 in a manner to rotate the element 73 clockwise (as viewed in Fig. 1) about the pivotal relation between shoulder 87 and stop 88 to bring the step or shoulder 84 of element 73 into engagement with stop 85 (Fig. 2). It is understood that the stud 94 during the stop condition of the telegraph apparatus, assumes the position indicated by dotted lines in Fig. 7. Such is the condition of the motor control device, as shown in Fig. 2, when and after the traffic on the signal line has ceased, and the timing device (Fig. 6) has operated the switch 49. This stand-by condition, with motor stopped, will persist so long as no signals are received on the signal line, which therefore remains in a marking condition (current on the line) and accordingly coil 111 of the selector magnet 109 and the motor control magnet 62 both remain operated. As previously mentioned, the floating element 73 is provided with the arm 81 which cooperates with the plate 82 secured to the magnet 62. Arm 81 and plate 82 cooperate in the following manner to lock the floating element 73 against dislodgment or displacement during the stand-by condition, above described, which dislodgment might otherwise have occurred due to jarrying of the apparatus: The pulling up of the armature 64 due to energization of magnet 62 not only caused the shoulder 83 to ride off of extension 71 to engage shoulder 84 therewith, but also caused the arm 81 to become locked between armature 64 (through pressure of extension 72 upon projection 86) and the plate 82, as indicated in Fig. 2. The continuance of the stand-by condition, mentioned above, is thus assured.

Figure 3:
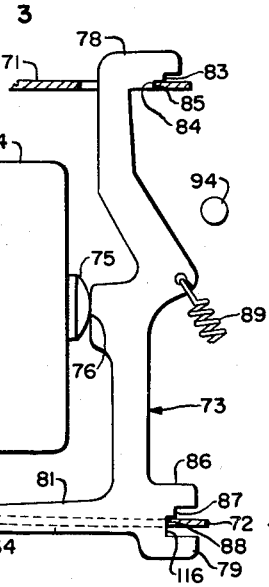

However, as soon as a spacing or no current signal is received, the magnet 62 will be de-energized; thus the armature 64 will be released, and its spring 66 will actuate it until the extension 72 rides off of the step or shoulder 87 into the position shown in Fig. 3, which position the armature 64 and the floating element 73 assume as a result of the spring pressure imparted to the floating element 73 by plunger 75 at the projection 76 causing the floating element 73 to rotate in a counter-clockwise direction (as viewed in Fig. 3) about the pivotal relation provided between shoulder 84 and stop 85. This movement of floating element 73; namely, its rotation counterclockwise about its pivotal articulation with extension 71, just described, is not, however, sufficient to permit contact 77 (Fig. 7) to close at this time. This rotational movement of element 73 is, however, sufficient to permit the end of arm 81 to clear the edge of plate 82, so that subsequent movement of element 73 will cause arm 81 and plate 82 to asume the relation shown in Fig. 4, as will presently appear. Motor 107 is still inert, since its circuit is still open at contacts 77 and 114. This step in the sequence of operations of the floating element 73 is a precautionary measure in the event the occurrence of a spacing condition is a line break instead of a spacing impulse inherent in signaling. Thus, if a break in the line circuit should occur after the motor has been stopped as just described, the motor 107 will not be started accidentally.

Figure 4:
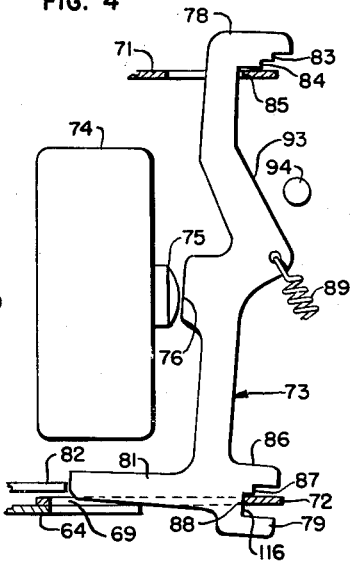

Now, when a marking condition (closed line) again occurs, the magnet 62 will be operated over the previously described circuit through contact 115 (still closed), and the armature 64 will be pulled up to allow contact 77 to close to effectuate the starting of the motor 107 in the following manner:

Prior to the re-occurrence of a marking condition on the signal line 108, the relation between the floating element 73 and the armature extension 72 is as shown in Fig. 3, with the extension 72 coacting with the confronting face of shoulder or step 87. Now, when the marking condition is re-established on the line 108, the armature 64 will be pulled up and the extension 72 will act through step 87 to move the floating element 73 toward the plate 71, thus disengaging the shoulder 84 from the plate 71, thereby permitting spring 89 to rotate the floating element 73 clockwise (as viewed in Fig. 4) about the pivotal relation between surface 116 of element 73 and the end 88 of guide slot 69 as a fulcrum to the position shown in Fig. 4, whereat the projection 76 of element 73 is no longer in contact with plunger 75, since plunger 75 has reached its extreme outward position with respect to switch 14, as indicated in Fig. 4, thus permitting contact 77 to close to complete an obvious circuit for motor 107, as shown in Fig. 7. As the floating element 73 is thus rotated clockwise (as viewed in Fig. 4) its arm 81 is brought in substantially abutal relationship with the edge of plate 82.

Pursuant to the condition established by the positionment of element 73 and armature extension 72 in Fig. 4, to thereby result in the closure of contact 77 (Fig. 7), the motor 107 will be started, and will supply power immediately to the shaft 11 which, as previously mentioned, is comparable to shaft 58, Fig. 2, of said copending application, on which is also carried the selector cam sleeve (not shown) associated with the selector magnet 109 in the manner shown in said copending application.

Then, in response to the spacing start impulse of the first received code signal, the selector magnet 109 will be de-energized to initiate rotation of the selector cam sleeve in well known manner, which in turn will, in timed relation thereto, initiate the operation of the shaft 56, which will function (1) through arm 55 to release the timing device to restore switch 49 to normal condition to close contacts 113 and 114 and open contact 115 as previously described and (2) through link 95 and stud 94 restore the floating element 73 from the operated position shown in Fig. 4 to the initial position shown in Fig. 1, in the following manner:

As stud 94 in its reciprocatory movement impinges against the cam surface 93 of floating element 73, it will initially rotate element 73 counterclockwise about point 88 of extension 72 as a fulcrum to rotate arm 81 clear of plate 82 to the position shown in Fig. 3 and then further urge or cam said element 73 both leftwardly and downwardly (as viewed in Figs. 1 to 4) to re-engage the shoulder 83 and 87 with extension 71 and 72, respectively. At the same time, the plunger 75 will be pressed inwardly with respect to the switch 74 to hold the contact 77 open. The contact 114, however, in the first described operating circuit for motor 107 has already been closed, so that by the time contact 77 is opened, the motor 107 is operating and accordingly, the telegraph apparatus is in readiness to respond to received code signals.

Although the invention has been described in connection with a certain specific form thereof, it will be understood that it has further applications, and that it is not limited to the embodiment shown.

What is claimed is:

1. In a motor control arrangement, a signal line, a timer, a motor control magnet controlled alternatively by said timer and signals on said line, a switch, an element controllable by the armature of said magnet to operate said switch, said element arranged to pivot about a plurality of points under the control of said armature, the armature of said magnet providing a movable fulcrum means arranged to be operable to select the points about which said element pivots to operate said switch to effect a motor controlling operation, and means to return said element to its initial position.

2. In a motor control arrangement, a signal line, a timer, a motor control magnet controlled alternatively by said timer and signals on said line, a switch, a floatingly mounted element controllable by the armature of said magnet to operate said switch, said element arranged to pivot about a plurality of points under the control of said armature, the armature of said magnet providing a movable fulcrum means arranged to be operable to select the points about which said element pivots to operate said switch to effect a motor controlling operation.

3. In a motor control arrangement, a signal line, a timer, a motor control magnet controlled alternatively by said timer and signals on said line, a switch, and an element controllable by the armature of said magnet to operate said switch, said element arranged to pivot about a plurality of points under the control of said armature, whereby the armature of said magnet provides a movable fulcrum means arranged to be operable to select the points about which said element pivots to operate said switch to effect a motor controlling operation.

4. In a motor control arrangement, a signal line, a timer, a motor control magnet controlled alternatively by said timer and signals on said line, a switch, an element having an initial position and a plurality of operative positions controllable by the armature of said magnet to operate said switch, said element arranged to pivot about a plurality of points under the control of said armature, the armature of said magnet providing a movable fulcrum means arranged to be operable to select the points about which said element pivots to assume its various operative positions to operate said switch to effectuate a motor controlling operation, and means to return said element to its initial position.

5. In a motor control arrangement, a signal line, a timer, a motor control magnet controlled alternatively by said timer and signals on said line, a switch, an element having an initial position and a plurality of operative positions controllable by the armature of said magnet to operate said switch, said element arranged to pivot about a plurality of points under the control of said armature, a fixed fulcrum member, the armature of said magnet providing a movable fulcrum means arranged to cooperate with said fixed fulcrum member to select the points about which said element pivots to assume its various operative positions to operate said switch to effectuate a motor controlling operation, and means to return said element to its initial position.

6. In a motor control arrangement, a signal line, a timer, a motor control magnet controlled alternatively by said timer and signals on said line, a switch, an element having an initial position and a plurality of operative positions controllable by the armature of said magnet to operate said switch, said element arranged to pivot about a plurality of points under the control of said armature, a fixed fulcrum member, said element having a first series of stepped facilities adapted to cooperate with said fixed fulcrum member and a second series of stepped facilities adapted to cooperate with said armature, whereby the armature of said magnet provides a movable fulcrum means arranged to coact with said second series of stepped facilities to cause said element to coact with said first series of stepped facilities to select the point about which said element pivots to assume its various operative positions to operate said switch to effectuate a motor controlling operation, and means to return said element to its initial position.

7. In a motor control arrangement, a signal line, a timer, a motor control magnet controlled alternatively by said timer and signals on said line, a switch, a floatingly mounted element having an initial position and a plurality of operative positions controllable by the armature of said magnet to operate said switch, said floatingly mounted element arranged to pivot about a plurality of points under the control of said armature, a fixed fulcrum member, said floatingly mounted element having a first series of stepped facilities adapted to cooperate with said fixed fulcrum member and a second series of stepped facilities adapted to cooperate with said armature, whereby the armature of said magnet provides a movable fulcrum means arranged to coact with said second series of stepped facilities to cause said floatingly mounted element to coact with said first series of stepped facilities to select the point about which said floatingly mounted element pivots to assume its various operative positions to operate said switch to effectuate a motor controlling operation, and means to return said floatingly mounted element to its initial position.

8. In a motor control arrangement, a signal line, a timer, a motor control magnet controlled alternatively by said timer and signals on said line, a switch, a floatingly mounted stepping lever having an initial position and a plurality of operative positions controllable by the armature of said magnet to operate said switch, said floatingly mounted stepping lever arranged to pivot about a plurality of points under the control of said armature, a fixed fulcrum member, said floatingly mounted stepping lever having a first series of stepped facilities cooperable with said fixed fulcrum member and a second series of stepped facilities cooperable with said armature, whereby the armature of said magnet provides a movable fulcrum means arranged to coact with said second series of stepped facilities to cause said floatingly mounted stepping lever to coact with said first series of stepped facilities to select the point about which said floatingly mounted stepping lever pivots to assume its various operative positions to operate said switch to effectuate a motor controlling operation, and means to return said floatingly mounted stepping lever to its initial position.

9. In a motor control arrangement, a signal line, a timer, a motor control magnet controlled alternatively by said timer and signals on said line, a switch, a stepping lever having an initial position and a plurality of operative positions controllable by the armature of said magnet to operate said switch, said stepping lever arranged to pivot about a plurality of points under the control of said armature, a fixed fulcrum member, said stepping lever having a first series of stepped facilities cooperable with said fixed fulcrum member and a second series of stepped facilities cooperable with said armature, whereby said armature provides a movable fulcrum means arranged to coact with said second series of stepped facilities to cause said stepping lever to coact with said first series of stepped facilities to select the point about which said stepping lever pivots to assume its various operative positions to operate said switch to effectuate a motor controlling operation, and means to return said stepping lever to its initial position.

10. In combination, an instrumentality to be actuated, an oscillatable member, and an element operable by said member to actuate said instrumentality, said element arranged to pivot about a plurality of points under the control of said member, whereby said member is adapted to provide a movable fulcrum means arranged to be operable to select the points about which said element pivots to actuate said instrumentality.

11. In combination, an instrumentality to be actuated, an oscillatable member, and an element operable by said member to actuate said instrumentality, said element arranged to pivot about a plurality of points under the control of said member, whereby said member provides a movable fulcrum means arranged to be operable to select the points about which said element pivots to actuate said instrumentality, and means to return said element to its initial position.

12. In combination, an instrumentality to be actuated, an oscillatable member, and an element having stepped facilities engageable by said member for actuating said instrumentality, said element arranged to pivot about a plurality of points under the control of said member, whereby said member provides a movable fulcrum means arranged to be operable to select the points about which said element pivots to control the stepping of said facilities to effect the actuation of said instrumentality.

13. In combination, an instrumentality to be actuated, a periodically operable member, an element having stepped facilitates engageable by said member for actuating said instrumentality, said element arranged to pivot about a plurality of points under the control of said member, and means whereby said member is effective to select the points about which said element pivots to control the stepping of said facilities to effect the actuation of said instrumentality.

14. Apparatus for remotely controlling the motor of a signal responsive recorder, which comprises a power supply line connected to said motor through a pair of normally closed contacts, a signaling line extending from a remote point to said recorder and having current flowing therein when in a normal condition, a three-position element movable sequentially into each of three positions, means for moving said three-position element sequentially into each of said three positions, means effective upon said signaling line remaining in said normal condition for a predetermined amount of time to open said normally closed contacts to disconnect said power supply line from said motor and to operate said first-mentioned means to move said three-position element into the first of said three positions, said first-mentioned means operable upon an interruption of current flow in said signaling line to move said three-position element into the second of said three positions, and a pair of normally open contacts closable by said three-position element when in said third position to reconnect said motor to said power supply to restart said motor, said first-mentioned means operable upon the resumption of current flow in said signaling line to move said three-position element into said third position to close said normally open contacts to restart said motor.

References Cited in the file of this patent
UNITED STATES PATENTS

| | | |
|---|---|---|
| 1,594,214 | Reiber et al. | July 27, 1926 |
| 1,938,597 | Krum | Dec. 12, 1933 |
| 2,640,873 | Moebius | June 2, 1953 |